(12) United States Patent
Downs

(10) Patent No.: US 7,419,363 B2
(45) Date of Patent: Sep. 2, 2008

(54) TURBINE BLADE WITH CERAMIC TIP

(75) Inventor: James Downs, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 516 days.

(21) Appl. No.: 11/206,471

(22) Filed: Aug. 18, 2005

(65) Prior Publication Data

US 2007/0292273 A1   Dec. 20, 2007

Related U.S. Application Data

(60) Provisional application No. 60/680,575, filed on May 13, 2005.

(51) Int. Cl.
    *B64C 27/46* (2006.01)
(52) U.S. Cl. .............................. 416/223 R; 416/229 R; 416/241 B
(58) Field of Classification Search ............. 416/223 R, 416/229 R, 229 A, 232, 241 B; 415/115
    See application file for complete search history.

(56) References Cited

U.S. PATENT DOCUMENTS

| | | | |
|---|---|---|---|
| 4,247,254 A | 1/1981 | Zelahy | |
| 4,247,259 A * | 1/1981 | Saboe et al. | 416/241 B |
| 4,390,320 A | 6/1983 | Eiswerth | |
| 4,411,597 A | 10/1983 | Kofel et al. | |
| 4,589,823 A | 5/1986 | Koffel | |
| 4,689,242 A | 8/1987 | Pike | |
| 4,790,721 A | 12/1988 | Morris et al. | |
| 4,802,828 A | 2/1989 | Rutz et al. | |
| 4,884,820 A | 12/1989 | Jackson et al. | |
| 5,264,011 A | 11/1993 | Brown et al. | |
| 5,359,770 A | 11/1994 | Brown et al. | |
| 6,190,124 B1 | 2/2001 | Freling et al. | |
| 6,468,040 B1 | 10/2002 | Grylls et al. | |
| 6,537,619 B2 * | 3/2003 | Johnson et al. | 427/449 |
| 6,648,596 B1 * | 11/2003 | Grylls et al. | 415/200 |
| 6,755,619 B1 | 6/2004 | Grylls et al. | |

FOREIGN PATENT DOCUMENTS

DE   1329592 A1 *   1/2002

* cited by examiner

*Primary Examiner*—Igor Kershteyn
(74) *Attorney, Agent, or Firm*—John Ryznic

(57) ABSTRACT

A blade used in a gas turbine engine in which the blade is formed of a blade portion made from a metallic material, and a tip portion made of a ceramic material, the tip portion forming at least 10% of the overall blade length such that the blade is lighter than a all-metallic blade. The ceramic tip of the blade allows the blade to withstand higher temperature environments without damaging the blade as would occur in an all-metallic blade.

15 Claims, 1 Drawing Sheet

TURBINE BLADE WITH CERAMIC TIP

CROSS-REFERENCE TO RELATED APPLICATIONS

This application claims the benefit to a Provisional Application U.S. Application No. 60/680,575 filed on May 13, 2005 and entitled Turbine Blade with a Ceramic Tip.

BACKGROUND OF THE INVENTION

1. Field of the Invention

The present invention relates to a turbine rotary blade used in a gas turbine engine, where the tip of the blade is made of a ceramic material.

2. Description of the Related Art Including Information Disclosed under 37 CFR 1.97 and 1.98

The future trend of advanced gas turbine engines for aircraft applications is to increase turbine rotor inlet temperature (RIT) to optimize turbine performance. Conventional modern turbine blades constructed of nickel-based super alloys must be substantially cooled to survive this high temperature environment. The root region of the blade must support the material above the root and is therefore subject to the highest levels of P/A stress. This region must be cooled to mitigate the effects of creep and potential stress rupture. However, the remainder of the blade, particularly the tip region, must be significantly cooled to prevent distress primarily in the form of oxidation and erosion.

Another trend of advanced gas turbines is to reduce weight by designing the turbine with the highest level of $AN^2$ possible. This increases the weight of rotating turbine blades, posing new challenges for blade and disc structural systems. It is well known in the art of gas turbine engines that weight can be minimized by designing the turbine blades with thin walls, and airfoil taper can be utilized to provide further reductions of weight by controlling the P/A stress levels. As a result of these trends, VAATE applications require lightweight turbine structures that can withstand the rigors of extreme thermal environments.

U.S. Pat. No. 4,689,242 issued to Pike on Aug. 25, 1987 shows a turbine blade used in a gas turbine engine, the blade made of a metal with a tip member made of ceramic attached to the tip end of the blade. However, the ceramic tip of this Pike invention is of such small mass that the lightweight benefits to the rotating blade discussed above does not apply.

Other prior art airfoils like U.S. Pat. No. 4,884,820 issued to Jackson et al on Dec. 5, 1989 show an airfoil with a ceramic portion extending from the tip of the metal blade airfoil, but the ceramic tip portion does not form any part of the fluid reaction airfoil surface. The above cited Pike patent includes a very small edge portion of the ceramic tip, but this portion exposed to the fluid flow does not provide any significant surface area on which the fluid flow reacts to transfer power from the motive fluid to the rotating blade.

The composite, lightweight blade structure of the present invention addresses both concerns of increased temperature operation and lightweight structures. The present invention is based on construction of a turbine blade using a composite structure where a high temperature, lightweight material would be used in the low to moderate P/A stress field near the tip of the blade. Ceramics represent one of the possible materials for use in this region. These materials have very high temperature capability and are considerably lighter than modern super alloy materials. Use of these materials provides the potential to significantly reduce cooling requirements in the traditionally difficult-to-cool tip region. However, the properties of these materials are characteristically inferior in terms of strength and load-carrying capability, thus limiting their useful application to the relatively low-stress tip region of the turbine blade. Significant overall system weight reduction is possible with the use of lightweight materials, even if only near the tip, because weight reductions realized at the tip are propagated throughout the entire blade airfoil, attachment and rotor disc system. The root region of the airfoil would be constructed of an advanced super alloy material to provide the strength necessary in the high P/A stress region. Cooling of this region remains necessary to provide adequate life for creep and oxidation/erosion.

BRIEF SUMMARY OF THE INVENTION

The present invention is directed to a gas turbine engine rotary blade made of a super alloy, but with a tip region made from a lightweight and high temperature resistant ceramic material. The tip region made of the ceramic material is large enough that the entire blade can withstand higher root stresses than would a blade under the same loads that was made entirely of the super alloy. In the present invention, the ceramic tip forms about 20% of the total length of the blade from root to tip and therefore the tip provides a significant surface area of the blade for which the motive fluid can act thereon and transfer power to the rotating blade.

Another feature of the present invention is the shape of the interface between the ceramic tip and the super alloy blade where the two members are joined together. The present invention includes a plurality of finger members extending radially from the super alloy blade portion with progressively reduced widths. The ceramic tip member has matching finger members such that a projecting finger of the blade will fit between adjacent finger members on the tip. A bonding material is used between the surfaces of the blade and the tip to secure the tip in place. This feature of the invention provides a greater surface area for bonding the blade to the tip than would a flat section on the blade as disclosed in the Pike U.S. Pat. No. 4,689,242.

DETAILED DESCRIPTION OF THE INVENTION

Figure 1:
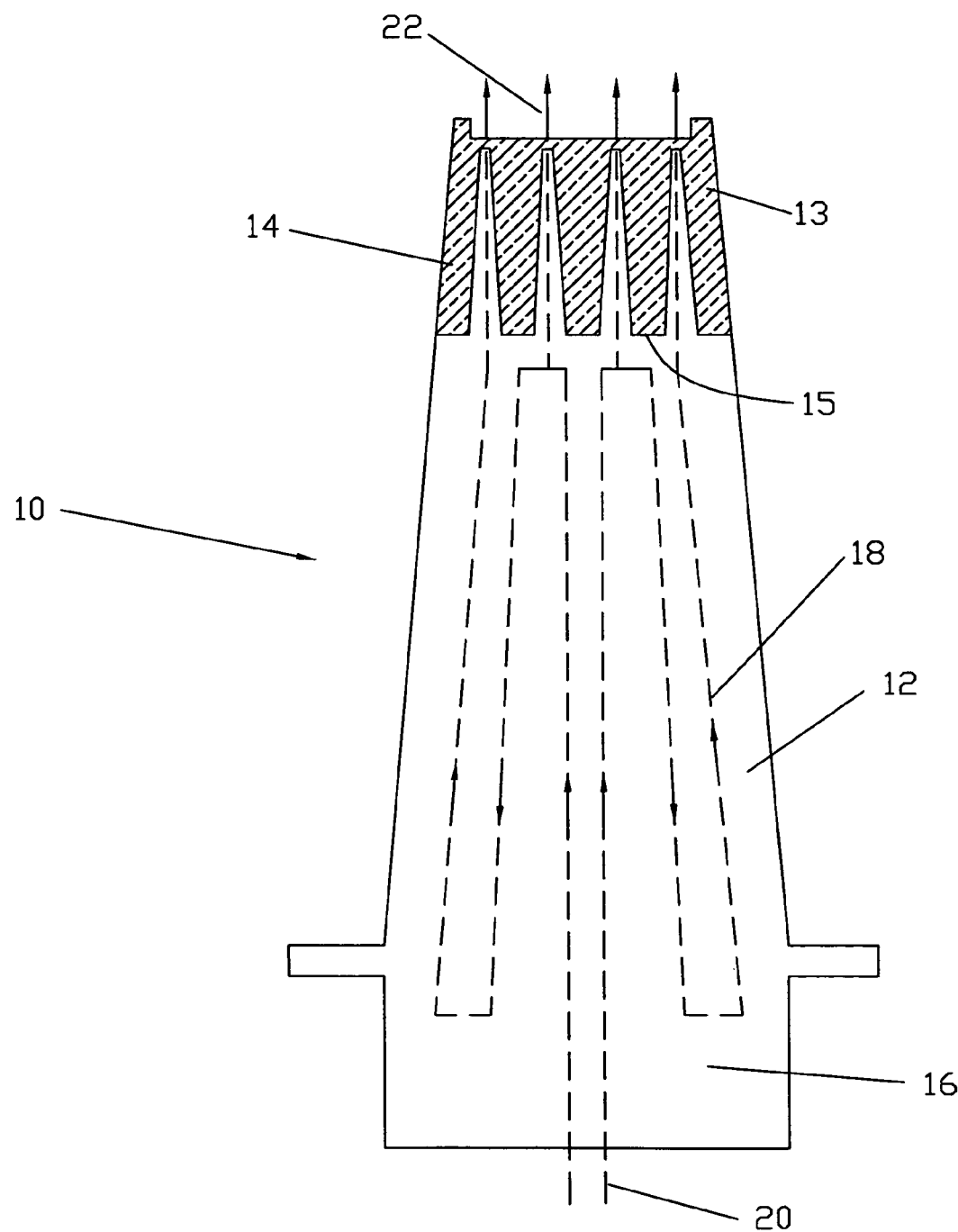
FIG. 1 shows the rotary blade of the present invention having most of the blade made from a super alloy and a tip region of the blade made from the ceramic material.

The present invention is a rotary blade assembly 10 used in a gas turbine engine. The blade assembly includes a blade section 12 made of a super alloy like nickel, and a tip section 14 that is made of a ceramic material. The blade assembly includes cooling passages 18 within the blade section 12 and the ceramic tip 14, the tip 14 having openings or holes to discharge the cooling air into the tip region for cooling. The turbine blade 10 includes a root portion 16 that includes a fir tree shape for securing the blade into a slot of a rotor disc. Any number of well known blade secure means can be used to secure the blade to the rotor disc. A cooling passage 20 enters the blade at the root portion 16 and exits the blade at the tip portion 13 through cooling passages 22.

The blade section includes fingers 13 extending in a radial direction along the blade axis, the blade fingers narrowing in the radial direction. The ceramic tip 14 also includes fingers 15 that extend radially inward and have such shape that the fingers 13 of the blade section 12 fit snuggly within fingers 15 of the tip. A bonding material is applied to the abutting surfaces of the two fingers to secure the tip 14 to the blade section 12.

In the present invention, the blade section is made from any of the well-known super alloys used in blades of gas turbine engines. The ceramic tip is made from any of the well-known ceramic or ceramic matrix composites used in gas turbine engines.

The size of the tip 14 with respect to the blade section 12 is large enough to reduce the weight of the overall blade 10 so that the P/A stress discussed above is reduced and the blade can be made with less material or can be made larger. As seen in FIG. 1, the ceramic tip is large enough to provide a significant surface area on which the motive fluid can act thereon to power from the motive fluid to the rotating blade. Also, the number of fingers used can vary depending upon the size of the tip and blade section. The length of the fingers can vary depending upon well-known engineering analysis to compare centrifugal force due to rotation with a binding force to prevent the tip from separating from the blade section. The blade fingers 13 are generally narrower than the tip fingers 15 because the blade section material is a higher density material than is the ceramic.

I claim the following:

1. A turbine blade for use in a gas turbine engine, the turbine blade comprising:
    a root portion having a means to secure the blade to a slot in a rotor disc;
    an airfoil portion extending from the root portion;
    a tip portion extending from the airfoil portion, the airfoil portion being made of a metallic material and the tip portion being made of a ceramic material; and,
    bonding means to secure the tip portion to the airfoil portion the tip portion mostly through shear stress and not tensile stress.

2. The turbine blade of claim 1, and further comprising:
    The bonding means comprises at least one finger extending from the tip end of the airfoil portion; and,
    the ceramic tip portion includes a finger shaped opening having substantially the same shape as the finger to secure the tip portion to the airfoil portion.

3. The turbine blade of claim 2, and further comprising:
    the finger includes a cooling air passage extending through the finger to discharge cooling air out from the tip portion of the blade.

4. The turbine blade of claim 2, and further comprising:
    the finger includes a decreasing width in the direction toward the blade tip.

5. The turbine blade of claim 2, and further comprising:
    the airfoil portion includes a plurality of fingers extending from the tip end; and,
    the ceramic tip portion includes a plurality of finger shaped openings each having substantially the same shape as the finger to secure the tip portion to the airfoil portion.

6. The turbine blade of claim 2, and further comprising:
    a bonding agent to secure the finger of the airfoil portion to the finger shaped opening in the tip portion.

7. The turbine blade of claim 2, and further comprising:
    the ceramic tip portion forms a squealer pocket for the blade.

8. The turbine blade of claim 3, and further comprising:
    the ceramic tip portion forms a squealer pocket for the blade; and,
    the cooling air passage through the finger opens into the squealer pocket.

9. The turbine blade of claim 2, and further comprising:
    The finger extends substantially parallel to the spanwise axis of the blade.

10. The turbine blade of claim 5, and further comprising:
    The plurality of fingers extends substantially parallel to the spanwise axis of the blade.

11. A process of forming a turbine blade used in a gas turbine engine, the process comprising the steps of:
    forming the airfoil portion and the root portion of the blade out of a metallic material;
    forming the tip portion out of a ceramic material; and,
    securing the ceramic tip portion to the metallic airfoil portion through mostly shear stress and not tensile stress; and,
    forming a metallic finger extending from the airfoil portion and a similar shaped opening in the ceramic tip portion to form the means to secure the tip portion to the airfoil portion in mostly shear stress.

12. A process of forming a turbine blade of claim 11, and further comprising the step of:
    forming a plurality of metallic fingers extending from the airfoil portion and a plurality of similar shaped openings in the ceramic tip portion.

13. A process of forming a turbine blade of claim 11, and further comprising the step of:
    cooling the finger by passing cooling air through a passage formed within the finger.

14. A process of forming a turbine blade of claim 13, and further comprising the step of:
    discharging the cooling air from the finger passage into tip of the blade.

15. A process of forming a turbine blade of claim 14, and further comprising the step of:
    discharging the cooling air passing through the finger into a squealer pocket formed by the ceramic tip portion.

* * * * *